United States Patent [19]
Kaneko

[11] Patent Number: 4,864,340
[45] Date of Patent: Sep. 5, 1989

[54] REMOTE CONTROL DEVICE HAVING AN ENERGY SOURCE CHARGED BY A CAMERA

[75] Inventor: Yoshiyuki Kaneko, Kanagawa, Japan

[73] Assignee: Canon Kabushiki Kaisha, Tokyo, Japan

[21] Appl. No.: 130,178

[22] Filed: Dec. 8, 1987

[30] Foreign Application Priority Data

Dec. 15, 1986 [JP] Japan ................... 61-299395
Dec. 15, 1986 [JP] Japan ................... 61-299396

[51] Int. Cl.⁴ .................. H04B 1/04; G03B 17/38
[52] U.S. Cl. .................. 354/266; 340/826.690; 340/826.720; 320/2
[58] Field of Search ........... 354/266, 288; 455/613, 455/618, 127, 343; 340/825.69, 825.72, 636; 315/241 R, 238, 241 P; 311/111, 143, 174, 173; 328/66, 37; 320/1, 2

[56] References Cited

U.S. PATENT DOCUMENTS 3,924,253 12/1975 Marino .................. 331/111
4,036,762 7/1977 Troetscher et al. ........ 354/266
4,310,785 1/1982 Iwata .
4,673,861 6/1987 Dubovsky et al. .

FOREIGN PATENT DOCUMENTS 55-77734 6/1980 Japan .................. 354/266
61-42627 3/1986 Japan .................. 354/266

Primary Examiner—Donald J. Yusko
Assistant Examiner—E. O. Pudpud
Attorney, Agent, or Firm—Fitzpatrick, Cella, Harper & Scinto

[57] ABSTRACT

A remote control device has a transmitter provided with a transmission circuit for producing a remote control signal, a first capacitor of small capacity upon discharging to drive the transmission circuit, a second capacitor of large capacity upon discharging to charge the first capacitor, and a pair of terminals for charging the second capacitor from the outside of the transmitter.

48 Claims, 5 Drawing Sheets

REMOTE CONTROL DEVICE HAVING AN ENERGY SOURCE CHARGED BY A CAMERA

BACKGROUND OF THE INVENTION

1. Field of the Invention

This invention relates to remote control devices for distant manipulation and, more particularly, to remote control devices suited to be used with cameras. Still more particularly, it relates to improvements of such devices for minimization of their size.

2. Description of the Related Art

In the remote control device for distant manipulation, it has been conventional that a transmitter has its own self-contained battery made contained and this battery is used as the drive source to give off the remote control signal in the form of light or ultrasonic wave. This accommodation of the battery, however, leads to increasing the size and weight of the transmitter. Hence, its portability and handiness has is lessened.

Taking an example of the camera, the basic structure of the conventional remote control device is explained by reference to FIGS. 9 and 10. FIG. 9 shows the construction and arrangement of the elements of the unifunctional remote control transmitter using pulse-modulated infrared light as the remote control signal, and FIG. 10 shows the elements of the receiver therefore. In FIG. 9, an oscillation circuit 1 produces pulses with a modulated frequency. Its output, when a push switch 6 is on, is supplied to the base of a transistor 3 through a resistor 5. An infrared light-emitting diode 2 (hereinafter referred to as iRED 2) produces a signal light as the remote control signal. A current limiting resistor 4 protects it. The above-described electrical power source or battery for the oscillation circuit 1 and iRED 2 is indicated at 7.

In FIG. 10, on the other hand, the above-described signal light is received by a photodiode 8. A load resistor 9; a coupling capacitor 10, an amplifier 11, a detector circuit 12 for the signal component in frequency, a wave-form shaping circuit 13, a code conversion circuit 14 as an interface to the camera.

Next, the operation of such a remote control device is described by using the waveforms of FIG. 11 wherein the lines on which the waveforms are shown are labeled the same reference characters as used in FIGS. 9 and 10. The oscillation circuit 1 of FIG. 9 oscillates at an equal frequency to the modulation frequency of the remote control signal. The application of its output to the base of the transistor 3 is maintained as long as the switch 6 is pushed. During this time, the transistor 3 repeats the on-and-off operation at the modulation frequency so that the pulsated current flows to the iRED 2. Thus, the pulse-modulated infrared light is produced as the remote control signal from the iRED 2.

On the receiver side of FIG. 10, as the photodiode 8 is reverse biased to the voltage Vcc of an electrical power source through the load resistor 9, when the remote control signal arrives in it, the current which is almost proportional to the amount of light received flows to the photodiode 8. Therefore, a voltage which is almost proportional to the received amount of light is produced at the conjunction of the photodiode 8 and the resistor 9. The coupling capacitor 10 passes the alternate current component of it to the amplifier 11 therethrough. The amplifier 11 produces an output signal denoted by $S_1$, due to the sensitivity of the photodiode 8 to not only the signal light but also the lights from the incandescent and fluorescent lamps, in such a form that the signal light appears together with noise as shown on line $S_1$ in FIG. 11. This output $S_1$ is applied to the detector circuit 12 which then produces an output representative only of the modulation frequency component from the transmitter of FIG. 9 in a form $S_2$ of FIG. 11. This form is further changed to the one shown on line $S_3$ by the wave-form shaping circuit 13.

This output $S_3$ is processed by the code conversion circuit 14 to form a signal capable of controlling the camera.

It will be seen that the electrical power required in the prior known remote control device is supplied from two separate batteries, one of which takes its place in the interior of the transmitter, and the other in common to the receiver and the camera. The creation of a space that the first battery occupies in the housing of the device and the increase of the weight it adds have been an obstacle to improve the portability and manageability of the remote control device.

SUMMARY OF THE INVENTION

The present invention has been made to eliminate the above-described drawback of the conventional remote control device, and its object is to provide a remote control device whose transmitter has, despite not containing the battery therein, to function likewise as in the prior art. To achieve this, the transmitter is provided with a first capacitor of small capacity arranged upon discharging to drive a transmission circuit for giving off the remote control signal, a second capacitor of large capacity arranged upon discharging to charge the first capacitor, and a pair of terminals through which the second capacitor is to be charged from the outside of the transmitter. Thus, the size and weight of the transmitter can radically be reduced.

Other objects of the invention will become apparent from the following description of embodiments thereof.

DETAILED DESCRIPTION OF THE PREFERRED EMBODIMENTS

The present invention is next described in connection with embodiments thereof by reference to the drawings.

Figure 1:
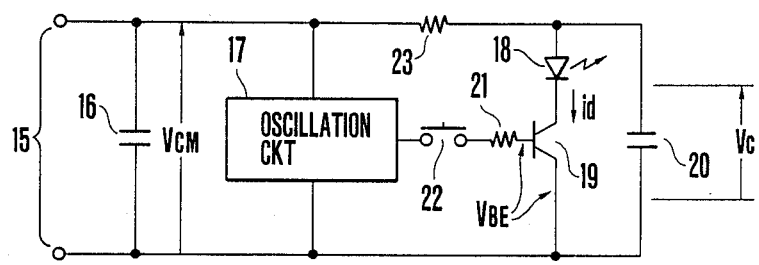
FIG. 1 is an electrical circuit diagram of the structure of an embodiment of a transmitter for the remote control device according to the invention.

In FIG. 1 there is shown an embodiment of the transmitter for the remote control device according to the invention comprising an infrared light-emitting diode 18 (hereinafter referred to as iRED 18) for producing a remote control signal in the form of infrared light, a switching transistor 19 for the iRED 18 forming a closed circuit together with a first capacitor 20 of small capacity (for example, an aluminum electrolytic capacitor of about 470 microfarads) for supplying driving energy to the iRED 18, an oscillation circuit 17 for producing a train of pulses with a modulation frequency for the signal, and a push switch 22 upon closure to pass the output of the oscillation circuit 17 to a resistor 21 connected to the base of the transistor 19. In order to charge the first capacitor 20, a second capacitor 16 of large capacity (for example, an electrical charge double-layer condenser of about 0.1 farad) is further included. Its two poles are connected, respectively, to two terminals 15 for charging and the electrical power source voltage supply and circuit earth terminals of the oscillation circuit 17, and further through a resistor 23 to the two poles of the first capacitor 20.

Figure 2:
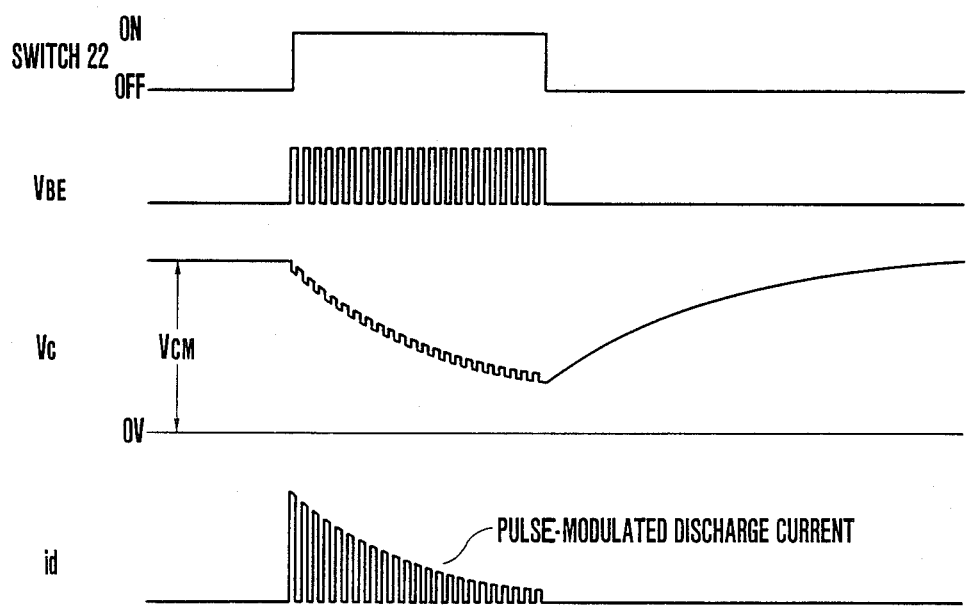
FIG. 2 shows waveforms illustrating a manner in which the circuit of FIG. 1 operates.

The operation of the transmitter of FIG. 1 is next described by using the waveforms of FIG. 2. It should be noted that all the lines on which the waveforms are shown in FIG. 2 are headed by the same reference characters as used in FIG. 1 to designate the corresponding places at which they occur. The second capacitor 16 of large capacity is assumed to have been charged to a voltage $V_{CM}$ by an electrical power source in the receiver or camera body. Meanwhile, the first capacitor 20 of small capacity for driving the iRED 18 has been charged to the same voltage $V_{CM}$ through the resistor 23.

So long as the push switch 22 is not depressed, the output of the oscillation circuit 17 is hindered from entering the base of the transistor 19. Therefore, the transistor 19 remains in OFF state. So, the iRED 18 gives off no light. Hence, no remote control signal is produced.

When the photographer depresses a button to close the switch 22, the output of the oscillation circuit 17 is then applied through the closed switch 22 and resistor 21 to the base of transistor 19. The voltage across the base-emitter path varies as shown on line $V_{BE}$ in FIG. 2. Responsive to this input, the transistor 19 repeats its on-and-off operation at the modulation frequency so that a pulsated current as shown on line id in FIG. 2 flows to the iRED 18 as the charge of the first capacitor 20 discharges thereto. Therefore, the voltage on that capacitor 20 lowers in a way as shown on line Vc in FIG. 2. For this time, the charge of the second capacitor 16, because of its internal resistance being as high as several tens to a hundred of ohms or thereabout, has little contribution to the energization of the iRED 18.

In such a manner, the iRED 18 is supplied with the pulse-modulated discharging current of decreasing intensities shown on line id in FIG. 2. Hence, a train of pulses of infrared light of proportional amplitudes are produced as the remote control signal. And, as the transmitter of FIG. 1 is aimed at the camera, the remote control signal is received by the receiver such as that described in connection with the prior art in FIG. 10. Thus, the camera is controlled in a similar manner by the receiver.

Then, when the push switch 22 is turned off, the transistor 19 is rendered non-conducting. Because the charge stored on the first capacitor 20 has been discharged to energize the iRED 18, it is at this time that its voltage drops to a level almost equal to the sum of the saturation voltage $V_{CE(SAT)}$ across the collector and emitter of the transistor 19 and the forward voltage $V_F$ of the iRED 18. Meanwhile, the second capacitor 16, because of its having the large capacity and of its charge being consumed only to operate the oscillation circuit 17 retains a voltage almost equal to the initial level of charged voltage $V_{CM}$. The first capacitor 20 is, therefore, fully charged again with the current from the second capacitor 16 during the time when the switch 22 is off, or the transistor 19 is in the non-conducting state, as shown on line Vc in FIG. 2. By the outflow of such current, the second capacitor 16 suffers from lowering by only 1% or thereabout of the maximum in voltage since the ratio of their capacities, if in the above-mentioned instances where the first and second capacitors 20 and 16 have several hundreds of microfarads and 0.1 farad respectively, amounts up to several hundreds. With the thus-recharged first capacitor 20, therefore, when the switch 22 is turned on again, the iRED 18 can produce pulses of infrared light with the result of an equivalent remote controlling effect to that of the first time.

Figure 3:
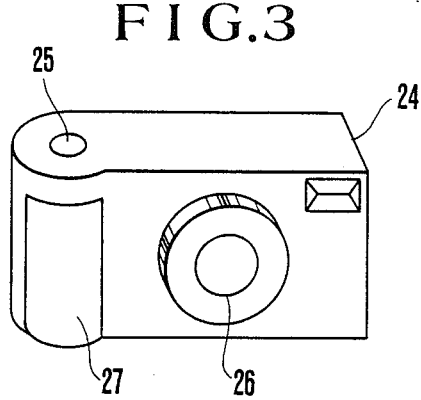
FIG. 3 is a perspective view illustrating the outer appearance of a camera employing the transmitter of FIG. 1.
Figure 4:
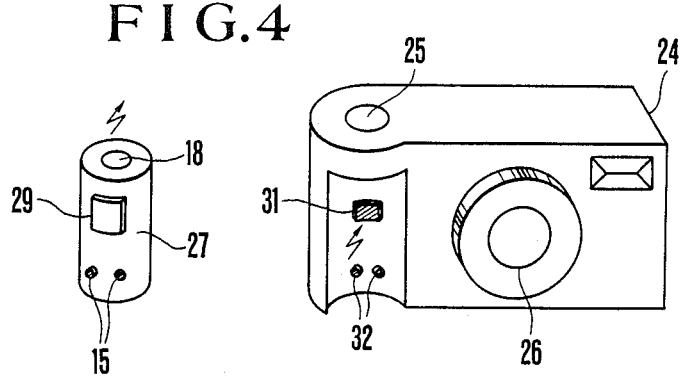
FIG. 4 is similar to FIG. 3 except that the transmitter is taken away from the camera housing.

Next, a camera of the type in which the remote control device using the transmitter of FIG. 1 is releasably attached to the camera housing is shown in a perspective of FIG. 3, where 24 is the camera housing, 25 is a release button, and 26 is a photographic lens. The circuit of FIG. 1 is housed in a transmitter 27 of a detachable type. In the attached state of FIG. 3, the transmitter 27 forms a grip for the camera together with the camera housing 24. FIG. 4 shows the detachable type transmitter 27 taken away from the camera housing 24. In FIG. 4, the iRED shown in FIG. 1 is indicated at 18. A release button 29 is used to actuate the switch 22. The pair of terminals for charging shown in FIG. 1 are indicated at 15, being arranged to contact with a pair of terminals 32 on the camera housing 24 when the transmitter 27 is fitted thereon. A photosensitive element 31 receives the remote control signal from the iRED 18.

Figure 5:
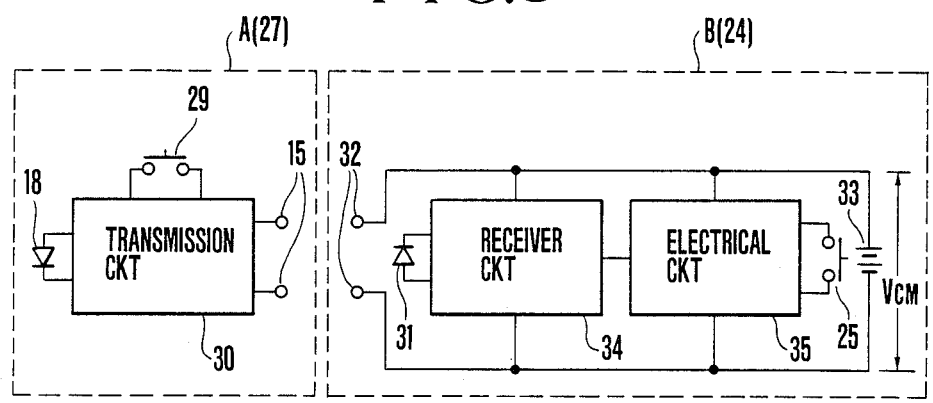
FIG. 5 is a block diagram of the transmitter and receiver of FIGS. 3 and 4.
Figure 10:
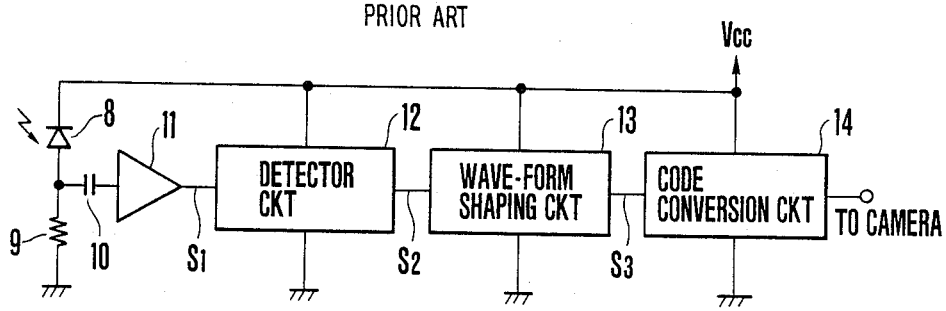
FIG. 10 is an electrical circuit diagram of the conventional receiver of the same.
Figure 11:
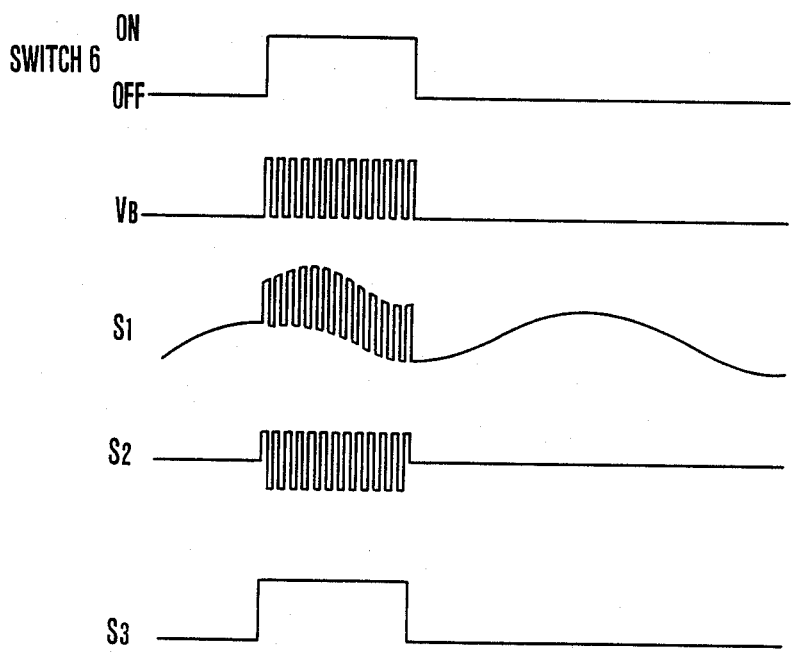
FIG. 11 shows waveforms of the signals in the device of FIGS. 9 and 10.

FIG. 5 is a block diagram of the circuitry of the camera of Figs. 3 and 4 with the left hand half A showing the circuitry of the transmitter 27, and the right hand B half showing the circuitry of the receiver and the other portions of the camera housing 24. In FIG. 5, 30 is a transmission circuit of such structure as shown in FIG. 1, and 33 is an electrical power source or battery within the camera housing 24. A receiver circuit 34 is of such a structure as shown in FIG. 10. An electrical circuit 35 of known construction operates the camera. The other parts in FIG. 5 are similar to those shown in FIG. 10. So, the same reference numerals have been employed and their explanation is omitted.

Figure 6:
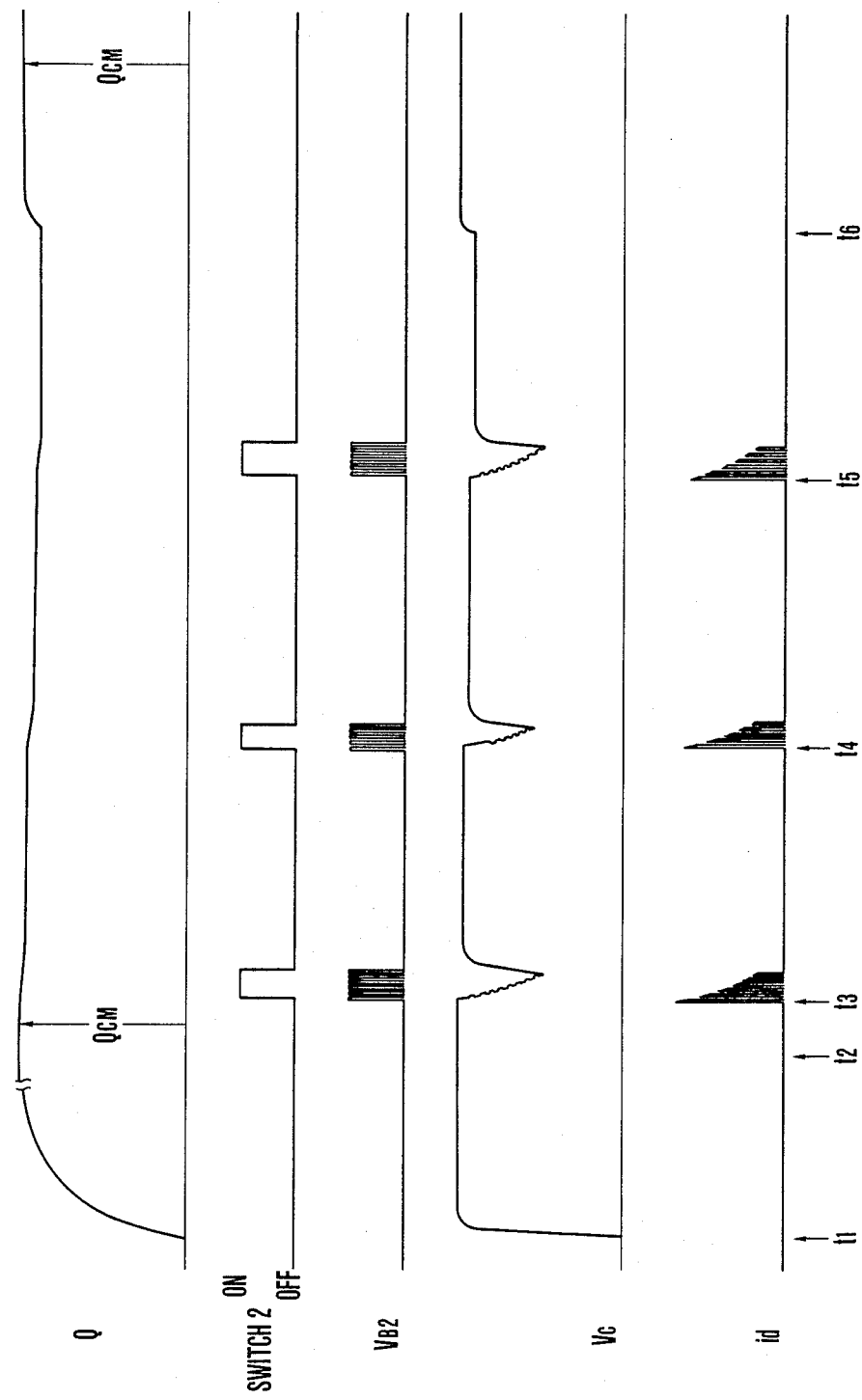
FIG. 6 shows waveforms illustrating a manner in which the circuits of FIG. 5 operate.

Next, the operation of the camera of the type having the remote control device of FIGS. 3 to 5 releasably attached is described by using the waveform diagrams of FIG. 6. In FIG. 6. a curve on a line Q shows the variation with time of the amount of charge stored on the second capacitor 16 of large capacity of FIG. 1 incorporated in the transmitter 27. Another line SW2 shows a series of actuations of the release button 29 for remote control of the transmitter 27. Another line $V_{B2}$ shows the potential at the base of the NPN type transistor 19 for driving the iRED 18. Another line Vc shows the variation of the voltage stored on the capacitor 20 of small capacity for driving g the iRED 18 of FIG. 1 incorporated in the transmitter 27. The last line id shows the current flowing to the photosensitive element 31 for the remote control signal in the receiver within the camera housing 24.

At first assuming that the transmitter 27 was long demounted from the camera housing 24, and the charge Q left on the capacitor 16 of large capacity is zero. At a time $t_1$, the transmitter 27 is put on the camera housing 24 with their pairs of terminals 15 and 32 in contact with each other. From this time onward, the large capacity capacitor 16 of the transmitter 27 is being charged from the electrical power source or battery 33 within the camera housing 24. Its amount of stored charge eventually reaches a corresponding level of charge $Q_{CM}$ to the voltage $V_{CM}$ of the battery 33.

At another time $t_2$, the transmitter 27 is taken away from the camera housing 24. The lowering of the charge Q of the large capacity capacitor 16 until the remote control operation is carried out is negligible because the transmission circuit 30 consumes very little electrical power except when energizing the iRED 18. At another time $t_3$, the remote control switch SW2 is actuated for the first time. In a similar manner to that described in connection with FIGS. 1 and 2, the iRED 18 is lighted on and off repeatedly by the pulsated discharging current. This light is received by the photosensitive element 31 in the camera housing 24. Responsive to a pulsated current therefrom, the electrical circuit 35 actuates a camera release.

After the first cycle of remote control operation is completed, the capacitor 20 of small capacity for driving the iRED 18 is fully charged by the capacitor 16 of large capacity before the next cycle of release operation is started at a time $t_4$. As the second and third cycles of remote control operation are carried out in sequence at the time $t_4$ and a time $t_5$, the charge on the capacitor 16 of large capacity gradually lowers. Yet, the total sum of these decreases is very slight compared with the initial level of stored charge. Hence, the remote control operation can be recycled a large number of times in sequence, as a series of continuous shots are taken. Also, in a photographic situation where one remote control operation is liable to fail in actuating a camera release, as the transmitter is set up at a longer distance from the camera than the remote control signal can reach, or noise or an obstacle interferes with the signal, the try and error approach can be made over any number of times whatever.

And, after the sequence of remote control operations have been completed, the transmitter 27 is mounted on the camera housing 24 at a time $t_6$. From this time onward, the capacitor 16 of large capacity is being recharged by the battery 33 within the camera housing 24. Thus, the camera is made ready for the next sequence of remote control operations.

Though the foregoing embodiment has been described in connection with the use of the particular frequency in forming the pulses of light as the signal, it is to be understood that if the technique of modulating the signal, for example, the pulse position modulation, is used, not only the simple operation such as the release operation, but also an elaborate operation such as that of changing over between two modes can be remotely performed.

Also, though, in the above described embodiment, the capacitor 16 of large capacity is always connected to the oscillation circuit 17, variations may be made. For example, when the transmitter 27 is contained in the camera housing 24, a mechanical switch is operated to disconnect the oscillation circuit 17 from the capacitor 16 of large capacity, leaving the latter in connection with the battery 33. This produces an advantage that the electrical energy which is consumed by the oscillation circuit 17 when the transmitter 27 is not in use can be saved. Particularly in application to an instrument whose usable battery is of small capacitance such as the camera described above, this advantage becomes very valuable.

Figure 7:
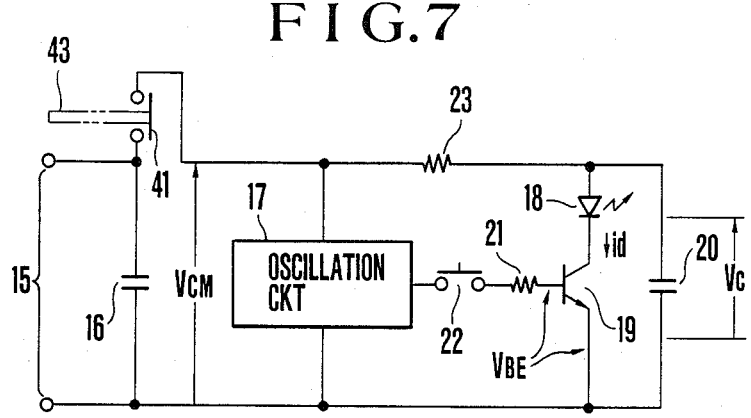
FIG. 7 is an electrical circuit diagram of an example of variation of a portion of the circuit of FIG. 1.
Figure 8:
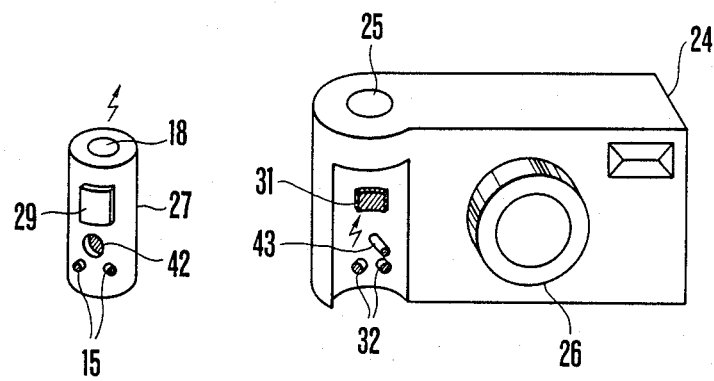
FIG. 8 is a perspective view of another camera which employs the circuit of FIG. 7.
Figure 9:
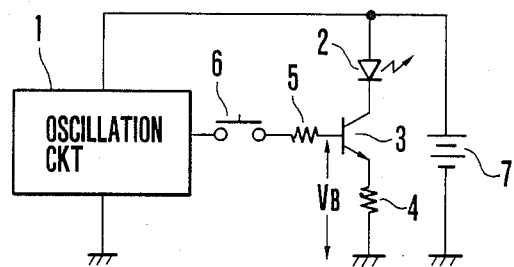
FIG. 9 is an electrical circuit diagram of the conventional transmitter of the remote control device.

So, an example of this variation is shown in FIGS. 7 and 8. The above-described feature is added to the circuit of FIG. 1 to form a circuit of FIG. 7. FIG. 8 is a similar perspective view to FIG. 4 except for the above-described feature. In FIGS. 7 and 8, the same reference numerals have been used to denote the similar parts to those shown in FIGS. 1 and 4 respectively, and their explanation is omitted.

In FIG. 7, a switch 41 is provided between a point on connection between the terminal 15 for charging and the second capacitor 16 and the positive voltage terminal of the oscillation circuit 17. As shown in FIG. 8, this switch 41 turns off as pushed by a pin 43 provided on the transmitter 27 through a hole 42 when the transmitter 27 is fitted on the camera housing 24. Thereby, the second capacitor 16 is charged through the terminals 15. But, during the time when the transmitter 27 is fitted on the camera housing 24, the switch 41 remains in the OFF state so that the oscillation circuit 17, the iRED 18 and the first capacitor 20 are never supplied with current, thus removing the opportunity of wastefully consuming the current by the oscillation circuit 17 which becomes useless when the transmitter 27 is fitted in the camera housing 24.

Next, when the transmitter 27 is detached from the camera housing 24 in order to carry out the remote control operation, the pin 43 moves away from the depression of the switch 41 and the switch 41 turns on. This state becomes exactly identical to the circuit structure of FIG. 1, permitting the remote control operation to be carried out in such a manner as described in connection with FIG. 1.

In each of the above-described embodiments, the reason why, in the transmitter 27, the capacitor 20 of small capacity is used for driving the iRED 18 is that, if the capacitor is of small capacity, its internal resistance is low impedance, and large current can be allowed to instantaneously flow to the iRED 18 with an advantage that the target distance for the remote control signal can be extended. Another reason why this capacitor 20 of small capacity is charged by the capacitor 16 of large capacity is that if, as the charge on the capacitor 20 of small capacity is all discharged in one remote control operation, there is the capacitor 16 of large capacity, the capacitor 20 of small capacity can be recharged repeatedly for each cycle of charging of the capacitor 16 of large capacity. This allows for the remote control operation to be carried out many times in sequence. Also, suppose the remote control operation fails once, another one can be tried again. Thereby, compared with the conventional transmitter having the battery incorporated therein, no functional inferiority is not resulted. And, in the above-described embodiments, when out of the remote control operation, the container of the transmitter 27 serves as part of the grip for the camera. During this time, the capacitor 16 of large capacity described above is fully charged by the battery 33 in the camera housing 24. Hence, the manageability is also very improved.

Further, the use of the capacitor 16 as the electrical power source of the transmitter 27 removes the necessity of exchange as is different from the case of using the primary battery. Even in comparison with the secondary battery, it is stable to recyclic charging and discharging. This permits it to be treated as one element of the circuit to be incorporated into the transmitter, thereby giving an additional advantage that there is no need of maintenance.

Also, though the remote control device of the above described embodiments have been applied to the camera, the remote control device of the invention is not confined with an application to the camera. It is needless to say that the invention is applicable to the remote control devices for other various types of instruments as well.

Further, the arrangement of the capacitor used as the electrical power source of the transmitter in the above-described embodiments can be employed even in the receiver.

As has been described above, according to the invention, the remote control device is provided with a transmitter which is constructed with a transmission circuit for producing a remote control signal, a first capacitor of small capacity whose discharging current drives the transmission circuit, a second capacitor of large capacity whose discharging current charges the first capacitor, and a pair of terminals for charging the second capacitor from the outside, thereby it being made possible to rid the conventional transmitter of its own battery while still preserving all its functions. This leads to achieve a big reduction of the size and weight of the transmitter and a great improvement of the portability and manageability of the remote control device.

What is claimed is:

1. A transmitter of a remote control device mountable and detachable from a camera, comprising:
   input means for taking in energy from the camera when the transmitter is mounted on the camera,
   said input means taking in no energy from the camera when the transmitter is detached from the camera, and,
   storing means for storing the energy taken in by the input means from the camera to drive the transmitter with the stored energy.

2. A device according to claim 1, wherein said input means includes a terminal to be connected with a terminal on the camera side when the transmitter is mounted on the camera.

3. A device according to claim 1, wherein said storing means includes charging means for accepting an electric charge.

4. A device according to claim 3, wherein said charging means includes first charging means for accepting the electric charge taken in by the input means, and second charge means to be charged by said first charge means to drive the transmitter, said first charge means having a larger capacity than said second charge means.

5. A device according to claim 4, further comprising a transmitting portion to transmit a remote control signal, said transmitting portion being driven by current discharged by said second charge means.

6. A device according to claim 4, further comprising restricting means for restricting the output of energy from the storing means in response to the mounting of the transmitter on the camera.

7. A device according to claim 1, wherein said storing means comprises a capacitor.

8. A device according to claim 7, wherein said capacitor includes a first capacitor for storing the energy taken in by the input means, and a second capacitor to be charged with energy by the first capacitor to drive the transmitter, said first capacitor having a larger capacity than said second capacitor.

9. A device according to claim 8, further comprising a transmitting portion for transmitting a remote control signal, said transmitting portion being driven by the energy stored in said second capacitor.

10. A device according to claim 8, further comprising restricting means for restricting the output of energy from the first capacitor in response to the mounting of the transmitter on the camera.

11. A device according to claim 1, further comprising restricting means for restricting the output of energy from the storing means in response to the mounting of the transmitter on the camera.

12. A device according to claim 1, wherein said transmitter forms part of the camera when it is mounted on the camera body.

13. A transmitter of a remote control device mountable and detachable from a portable instrument, comprising:
   input means for taking in energy from the portable instrument when the transmitter is mounted on the portable instrument,
   said input means taking in no energy from the portable instrument when the transmitter is detached from the portable instrument, and,
   storing means for storing the energy taken in by the input means from the portable instrument to drive the transmitter with the stored energy.

14. A device according to claim 13, wherein said input means includes a terminal to be connected with a terminal on the portable instrument side when the transmitter is mounted on the portable instrument.

15. A device according to claim 13, wherein said storing means includes charging means for accepting electric charge.

16. A device according to claim 15, wherein said charging means includes first charging means for accepting the electric charge taken in by the input means, and second charge means to be charged by said first charge means to drive the transmitter, said first charge means having a larger capacity than said second charge means.

17. A device according to claim 16, further comprising a transmitting portion to transmit a remote control signal, said transmitting portion being driven by current discharged by said second charge means.

18. A device according to claim 16, further comprising restricting means for restricting the output of energy from the storing means in response to the mounting of the transmitter on the portable instrument.

19. A device according to claim 13, wherein said storing means comprises a capacitor.

20. A device according to claim 19, wherein said capacitor includes a first capacitor for storing the energy taken in by the input means, and a second capacitor to be charged with energy by the first capacitor to drive the transmitter, said first capacitor having a larger capacity than said second capacitor.

21. A device according to claim 20, further comprising a transmitting portion for transmitting a remote control signal, said transmitting portion being driven by the energy stored in said second capacitor.

22. A device according to claim 20, further comprising restricting means for restricting the output of energy from the first capacitor in response to the mounting of the transmitter on the portable instrument.

23. A device according to claim 13, further comprising restricting means for restricting the output of energy from the storing means in response to the mounting of the transmitter on the portable instrument.

24. A device according to claim 13, wherein said transmitter forms part of the portable instrument when it is mounted on the portable instrument.

25. A camera having a transmitter of a remote control device mountable and detachable therefrom, comprising:
   input means for taking in energy from the camera when the transmitter is mounted on the camera,
   said input means taking in no energy from the camera when the transmitter is detached from the camera, and,
   storing means for storing the energy taken in by the input means from the camera to drive the transmitter with the stored energy.

26. A camera according to claim 25, wherein said input means includes a terminal to be connected with a terminal on the camera side when the transmitter is mounted on the camera.

27. A camera according to claim 25, wherein said storing means includes charging means for accepting an electric charge.

28. A camera according to claim 27, wherein said charging means includes first charging means for accepting the electric charge taken in by the input means, and second charge means to be charged by said first charge means to drive the transmitter, said first charge means having a larger capacity than said second charge means.

29. A camera according to claim 28, further comprising a transmitting portion to transmit a remote control signal, said transmitting portion being driven by current discharged by said second charge means.

30. A camera according to claim 28, further comprising restricting means for restricting the output of energy from the storing means in response to the mounting of the transmitter on the camera.

31. A camera according to claim 25, wherein said storing means comprises a capacitor.

32. A camera according to claim 31, wherein said capacitor includes a first capacitor for storing the energy taken in by the input means, and a second capacitor to be charged with energy by the first capacitor to drive the transmitter, said first capacitor having a larger capacity than said second capacitor.

33. A camera according to claim 32, further comprising a transmitting portion for transmitting a remote control signal, said transmitting portion being driven by the energy stored in said second capacitor.

34. A camera according to claim 32, further comprising restricting means for restricting the output of energy from the first capacitor in response to the mounting of the transmitter on the camera.

35. A camera according to claim 25, further comprising restricting means for restricting the output of energy from the storing means in response to the mounting of the transmitter on the camera.

36. A camera according to claim 25, wherein said transmitter forms part of the camera when it is mounted on the camera body.

37. A portable instrument having a transmitter of a remote control device mountable and detachable therefrom, comprising:
   input means for taking in energy from the portable instrument when the transmitter is mounted on the portable instrument,
   said input means taking in no energy from the portable instrument when the transmitter is detached from the portable instrument, and,
   storing means for storing the energy taken in by the input means from the portable instrument to drive the transmitter with the stored energy.

38. A device according to claim 37, wherein said input means includes a terminal to be connected with a terminal on the portable instrument side when the transmitter is mounted on the portable instrument.

39. A device according to claim 37, wherein said storing means includes charging means for accepting an electric charge.

40. A device according to claim 39, wherein said charging means includes first charging means for accepting the electric charge taken in by the input means, and second charge means to be charged by said first charge means to drive the transmitter, said first charge means having a larger capacity than said second charge means.

41. A device according to claim 13, further comprising a transmitting portion to transmit a remote control signal, said transmitting portion being driven by current discharged by said second charge means.

42. A device according to claim 40, further comprising restricting means for restricting the output of energy from the storing means in response to the mounting of the transmitter on the portable instrument.

43. A device according to claim 32, wherein said storing means comprises a capacitor.

44. A device according to claim 43, wherein said capacitor includes a first capacitor for storing the energy taken in by the input means, and a second capacitor to be charged with energy by the first capacitor to drive the transmitter, said first capacitor having a larger capacity than said second capacitor.

45. A device according to claim 44, further comprising a transmitting portion for transmitting a remote control signal, said transmitting portion being driven by the energy stored in said second capacitor.

46. A device according to claim 44, further comprising restricting means for restricting the output of energy from the first capacitor in response to the mounting of the transmitter on the portable instrument.

47. A device according to claim 37, further comprising restricting means for restricting the output of energy from the storing means in response to the mounting of the transmitter on the portable instrument.

48. A device according to claim 37, wherein said transmitter forms part of the camera when it is mounted on the portable instrument.

* * * * *

UNITED STATES PATENT AND TRADEMARK OFFICE
CERTIFICATE OF CORRECTION

PATENT NO. : 4,864,340
DATED : September 5, 1989
INVENTOR(S) : Yoshiyuki Kaneko

It is certified that error appears in the above-identified patent and that said Letters Patent is hereby corrected as shown below:

COLUMN 1:

Line 15, "made contained" should be deleted.

Line 20, "has" should be deleted.

COLUMN 5:

Line 4, "g" should be deleted.

COLUMN 6:

Line 66, "is not resulted" should read --results--.

COLUMN 8:

Line 36, "and," should read --and--.

UNITED STATES PATENT AND TRADEMARK OFFICE
CERTIFICATE OF CORRECTION

PATENT NO. : 4,864,340            Page 2 of 2

DATED : September 5, 1989

INVENTOR(S) : Yoshiyuki Kaneko

It is certified that error appears in the above-identified patent and that said Letters Patent is hereby corrected as shown below:

<u>COLUMN 9</u>:

Line 36, "claim 13," should read --claim 40,--.

Line 44, "claim 32," should read --claim 37,--.

Signed and Sealed this

Twenty-sixth Day of March, 1991

*Attest:*

HARRY F. MANBECK, JR.

*Attesting Officer*          *Commissioner of Patents and Trademarks*